(12) United States Patent
Seo

(10) Patent No.: US 9,779,626 B2
(45) Date of Patent: Oct. 3, 2017

(54) VEHICLE, AND APPARATUS AND METHOD FOR CONTROLLING VEHICLE

(71) Applicant: HYUNDAI MOTOR COMPANY, Seoul (KR)

(72) Inventor: Kwang Won Seo, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/947,863

(22) Filed: Nov. 20, 2015

(65) Prior Publication Data
US 2017/0032677 A1 Feb. 2, 2017

(30) Foreign Application Priority Data
Jul. 30, 2015 (KR) .................. 10-2015-0108079

(51) Int. Cl.
*B60Q 1/00* (2006.01)
*G08G 1/16* (2006.01)
*B60Q 9/00* (2006.01)

(52) U.S. Cl.
CPC ............ *G08G 1/167* (2013.01); *B60Q 9/008* (2013.01)

(58) Field of Classification Search
CPC .......... G08G 1/167; G08G 1/166; G08G 1/14; G08G 1/0962; G08G 1/0967; G08G 1/163; G08G 1/165; G08G 1/16; G08G 1/161; G08G 1/162; G08G 1/164; G08G 1/22; G06K 9/00798; G06K 9/00791; G06K 9/00805
USPC ............ 340/435, 901, 902, 903, 905, 425.5, 340/426.1, 426.24
See application file for complete search history.

(56) References Cited

U.S. PATENT DOCUMENTS

| | | | | |
|---|---|---|---|---|
| 5,777,451 A | * | 7/1998 | Kobayashi | B61L 23/34 180/169 |
| 8,457,827 B1 | * | 6/2013 | Ferguson | G05D 1/00 180/169 |
| 2008/0238718 A1 | * | 10/2008 | Jung | B62D 15/025 340/901 |
| 2009/0243825 A1 | | 10/2009 | Schofield | |
| 2011/0080302 A1 | * | 4/2011 | Muthaiah | H04L 47/10 340/903 |
| 2013/0253767 A1 | * | 9/2013 | Lee | B60W 50/04 701/42 |
| 2014/0203925 A1 | * | 7/2014 | Augst | B60Q 9/007 340/435 |

(Continued)

FOREIGN PATENT DOCUMENTS

| | | |
|---|---|---|
| JP | 2006-069322 A | 3/2006 |
| JP | 2008-117054 A | 5/2008 |

(Continued)

*Primary Examiner* — Daniel Previl
(74) *Attorney, Agent, or Firm* — Brinks Gilson & Lione

(57) ABSTRACT

Disclosed is a vehicle, and an apparatus and method for controlling the vehicle. The vehicle includes a line information obtainer configured to obtain information regarding a line; a vehicle controller configured to determine whether the vehicle is moving out of a lane based on the information regarding the line, and to determine a level of danger that indicates an extent of danger to the vehicle while the vehicle is changing the lane, based on at least one of a condition around the vehicle or a behavior of the vehicle while the vehicle is moving out of the lane; and a warning unit configured to provide different levels of alert to a driver based on the level of danger.

20 Claims, 13 Drawing Sheets

(56) References Cited

U.S. PATENT DOCUMENTS

2015/0278614 A1* 10/2015 Lee .................... G06K 9/00798
  348/148
2015/0344033 A1* 12/2015 Fukuda ................ B60W 30/16
  701/117

FOREIGN PATENT DOCUMENTS

| JP | 2012159989 | 8/2012 |
| KR | 1020120135697 | 12/2012 |
| KR | 1020150026203 | 3/2015 |
| KR | 10-2015-0078545 A | 7/2015 |

* cited by examiner

VEHICLE, AND APPARATUS AND METHOD FOR CONTROLLING VEHICLE

CROSS-REFERENCE TO RELATED APPLICATION(S)

This application Claims the benefit under 35 U.S.C. §119(a) of Korean Patent Application No. 10-2015-0108079, filed on Jul. 30, 2015 in the Korean Intellectual Property Office, the entire disclosure of which is incorporated hereby incorporated by reference.

BACKGROUND

1. Field

The present disclosure relates to a vehicle, and apparatus and method for controlling the vehicle.

2. Description of the Related Art

Vehicles transport people or goods to destinations while driving along roads or tracks. The vehicle may move in a certain direction with one or more wheels installed onto the frame of the vehicle to carry the people or goods. As for the vehicle, there may be three- or four-wheel vehicles, a two-wheel vehicle such as a motorcycle, construction machinery, bicycles, trains traveling along rails on the tracks, and the like.

Three- or four-wheel vehicles typically drive on roads including paved and unpaved roads. Paved roads may have lanes to guide traffic smoothly and safely. The lane refers to a part of the road, which is partitioned with lines for vehicles to move in a file within the lane. The lines are safety marks to indicate borders between lanes, and may include ones to separate vehicles moving in the same direction and ones to separate vehicles moving in different directions (hereinafter, referred to as center lines). Vehicles may travel along the lanes partitioned with the lines or travel while changing lanes, according to the driver's operation or predefined settings. The lanes may also be called lines, and accordingly, the expression 'change lanes' and 'deviate a lane' may also be called 'cross lines' and 'deviate lines', respectively.

SUMMARY

An object of the present disclosure is to provide a vehicle, and apparatus and method for controlling the vehicle, which may provide different alerts according to different levels of danger to the vehicle while the vehicle is changing lanes.

Another object of the present disclosure is to provide a vehicle, and apparatus and method for controlling the vehicle, which may provide different alerts for the driver according to different levels of danger to the vehicle while the vehicle is changing lanes, thereby improving the emotional quality of a lane departure warning system.

To achieve the aforementioned objects, a vehicle, and apparatus and method for controlling the vehicle is provided.

In one aspect of the present disclosure, a vehicle is provided. The vehicle includes a line information obtainer for obtaining information regarding a line; a vehicle controller for determining whether the vehicle is moving out of a lane by using the information regarding the line, and determining a level of danger that indicates an extent of danger to the vehicle while the vehicle is changing the lane, based on at least one of a condition around the vehicle and a behavior of the vehicle while the vehicle is moving out of the lane; and a warning unit for providing different levels of alert to a driver according to the level of danger.

The warning unit may provide a first level of alert if the level of danger is relatively high, and a second level of alert, which is different from the first level of alert, if the level of danger is relatively low.

The vehicle may further include at least one rear-side vehicle recognizer for recognizing another vehicle from a rear and side direction (or rear-side direction) of the vehicle, wherein the vehicle controller may determine that the level of danger is high if the rear-side vehicle recognizer recognizes at least one other vehicle while the vehicle is moving out of the lane, and the warning unit may provide the first level of alert to the driver.

The vehicle may further include at least one front vehicle recognizer for recognizing another vehicle ahead of the vehicle, wherein the vehicle controller may determine that the level of danger is high if the front vehicle recognizer recognizes at least one other vehicle while the vehicle is moving out of the lane, and the warning unit may provide the first level of alert to the driver.

The vehicle controller may compare a heading angle of the vehicle with a predetermined threshold angle while the vehicle is moving out of the lane, and determine that the level of danger is medium if the heading angle is greater than the threshold angle, and the warning unit may provide the second level of alert to the driver.

The different levels of alert may further include a third level of alert that corresponds to a relatively lower level of danger than the level of danger corresponding to the second level of alert, and the warning unit may provide the third level of alert to the driver if the heading angle of the vehicle is smaller than the threshold angle.

The vehicle may further include a vehicle recognizer for recognizing another vehicle in at least one of the forward direction and rear-side direction of the vehicle, and the vehicle controller may compare the heading angle of the vehicle with the predetermined threshold angle if the vehicle recognizer fails to recognize the other vehicle.

The vehicle controller may detect a lane departure speed of the vehicle while the vehicle is moving out of the lane, and compare the lane departure speed with a predetermined threshold speed, and the warning unit may provide the second level of alert to the driver if the lane departure speed is higher than the threshold speed.

The warning unit may include at least one of a vibrator, a display, and a sound output.

The vibrator may be located in at least one of a spoke and a wheel for gripping in a steering wheel, and provide different intensities of vibration according to the level of danger.

In accordance with another aspect of the present disclosure, a method for controlling a vehicle is provided. The method includes obtaining information regarding a line; determining whether the vehicle is moving out of a lane based on the information regarding the line; determining a level of danger that indicates an extent of danger while the vehicle is changing the line, based on at least one of a condition around the vehicle and a behavior of the vehicle while the vehicle is moving out of the lane; and providing different levels of alert to a driver according to the level of danger.

Providing different levels of alert to a driver according to the level of danger may include providing a first level of alert if the level of danger is relatively high, and a second level of alert, which is different from the first level of alert, if the level of danger is relatively low.

The method may further include recognizing another vehicle from the rear-side direction of the vehicle, and determining a level of danger that indicates an extent of danger while the vehicle is changing the line, based on at least one of a condition around the vehicle and a behavior of the vehicle while the vehicle is moving out of the lane may include determining that the level of danger is high if the rear-side vehicle recognizer recognizes at least one other vehicle while the vehicle is moving out of the lane, and providing different levels of alert to a driver according to the level of danger may include providing the first level of alert to the driver.

The method may further include recognizing another vehicle ahead of the vehicle, and determining a level of danger that indicates an extent of danger while the vehicle is changing the line, based on at least one of a condition around the vehicle and a behavior of the vehicle while the vehicle is moving out of the lane may include determining that the level of danger is high if the front vehicle recognizer recognizes at least one other vehicle while the vehicle is moving out of the lane, and providing different levels of alert to a driver according to the level of danger may include providing the first level of alert to the driver.

Determining a level of danger that indicates an extent of danger while the vehicle is changing the line, based on at least one of a condition around the vehicle and a behavior of the vehicle while the vehicle is moving out of the lane may include: comparing a heading angle of the vehicle with a predetermined threshold angle while the vehicle is moving out of the lane, and determining that the level of danger is medium if the heading angle is greater than the threshold angle, and providing different levels of alert to a driver according to the level of danger may include providing the second level of alert to the driver.

Determining a level of danger that indicates an extent of danger while the vehicle is changing the line, based on at least one of a condition around the vehicle and a behavior of the vehicle while the vehicle is moving out of the lane may include: providing a third level of alert that corresponds to a relatively lower level of danger than the level of danger corresponding to the second level of alert, and providing different levels of alert to a driver according to the level of danger may include providing the third level of alert to the driver if the heading angle of the vehicle is smaller than the threshold angle.

Comparing a heading angle of the vehicle with a predetermined threshold angle while the vehicle is moving out of the lane may be performed if no vehicle is recognized from at least one of the forward direction and the rear-side direction of the vehicle.

Determining a level of danger that indicates an extent of danger while the vehicle is changing the line, based on at least one of a condition around the vehicle and a behavior of the vehicle while the vehicle is moving out of the lane may include: detecting a lane departure speed of the vehicle while the vehicle is moving out of the lane, comparing the lane departure speed with a predetermined threshold speed, and determining the level of danger to be medium if the lane departure speed is higher than the threshold speed, and providing different levels of alert to a driver according to the level of danger may include: providing the second level of alert to the driver.

The warning unit may include at least one of a vibrator, a display, and a sound output.

The vibrator may be located in at least one of a spoke and a wheel for gripping in a steering wheel, and provide different intensities of vibration according to the level of danger.

In another aspect of the present disclosure, an apparatus for controlling a vehicle is provided. The apparatus includes a danger level determiner for determining a level of danger indicating an extent of danger while the vehicle is moving out of the lane, based on at least one of whether there is another vehicle ahead of the vehicle, whether there is another vehicle from the rear-side direction of the vehicle, an heading angle of the vehicle, and a lane departure speed of the vehicle, if it is determined that the vehicle is moving out of the lane; and controlling a warning unit according to the level of danger.

Other aspects, advantages, and salient features of the disclosure will become apparent to those skilled in the art from the following detailed description, which, taken in conjunction with the annexed drawings, discloses exemplary forms of the disclosure.

BRIEF DESCRIPTION OF THE DRAWINGS

The above and other features and advantages of the present disclosure will become more apparent by describing in detail exemplary forms thereof with reference to the attached drawings in which.

Throughout the drawings, like reference numerals will be understood to refer to like parts, components, and structures.

DETAILED DESCRIPTION

Figure 1:
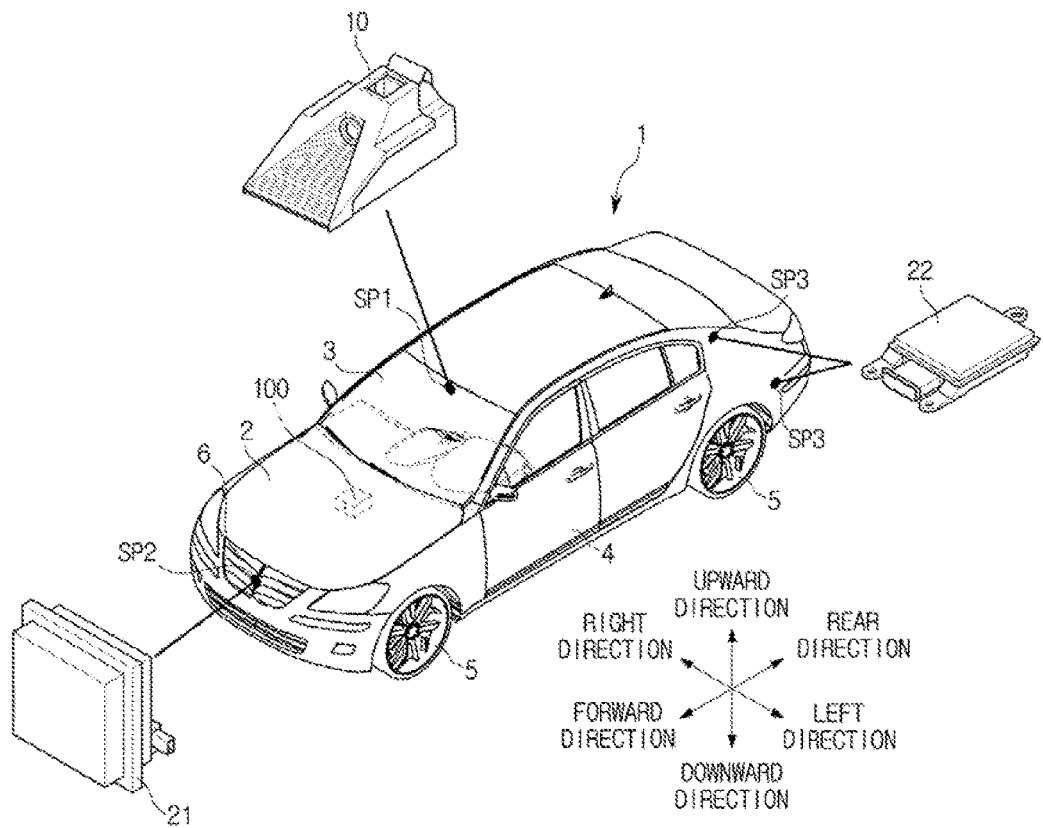
FIG. 1 shows the exterior of a vehicle.
Figure 2:
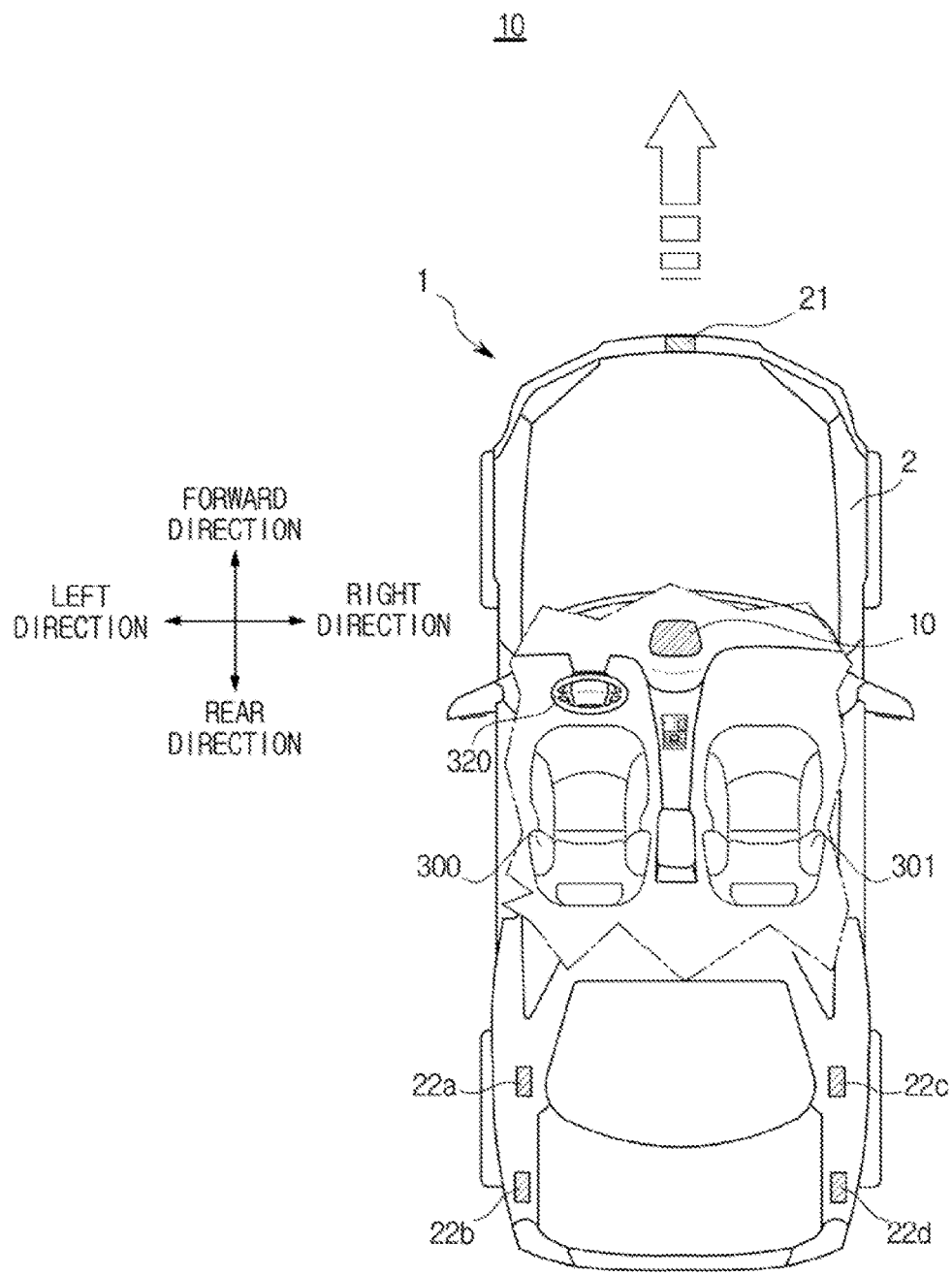
FIG. 2 is a plane view of a vehicle.

FIG. 1 shows the exterior of a vehicle, and FIG. 2 is a plane view of a vehicle. For convenience of explanation, as shown in FIGS. 1 and 2, a direction in which a vehicle 1 is moving forward is called a forward direction, and left and right directions with respect to the forward direction are called left and right directions. If the forward direction is at the twelve o'clock position, the right direction is defined to be at or around the three o'clock position, and if the left direction is defined to be at or around the nine o'clock position. The opposite direction of the forward direction is the rear direction. Also, a direction down to the floor of the vehicle 1 is called a downward direction, and a direction opposite to the downward direction is called an upward direction. Furthermore, a side located ahead is called a front side, a side located behind is called a rear side, and sides located on either sides are called sides. The sides include left and right sides.

The vehicle 1 refers to a transportation means that is able to travel along the roads or tracks. For convenience of explanation, a four-wheel vehicle will now be taken as an example of the vehicle 1, but the vehicle 1 is not limited to the four-wheel vehicle, but may include a two-wheel vehicle, a three-wheel vehicle, construction machinery, or a bicycle or motor bicycle.

Referring to FIGS. 1 and 2, the vehicle 1 includes an external frame 2 that constitutes the exterior of the vehicle 1. A windshield 3 for blocking wind from blowing into the vehicle 1, doors 4 opened and shut for the driver or passenger to get in and out of the vehicle 1, and at least one wheel 5 for moving the vehicle in a certain direction are installed on the external frame 2. A radiator grill 6 for sucking air for cooling a radiator may be installed on the front of the external frame 2.

The vehicle 1 may include at least one line information obtainer 10 or at least one vehicle recognizer 21, 22. The line information obtainer 10 or the vehicle recognizer 20 may be installed on at least one spot sp1 to sp4 on the vehicle 1 to easily acquire information regarding the surroundings of the vehicle 1. For example, the line information obtainer 10 or the vehicle recognizer 20 may be installed on the inside of the windshield 3 (sp1), a part, e.g., the inside, of the radiator grill 6 (sp2), a part of a C pillar (sp3), and/or a part of a rear fender (sp4). The line information obtainer 10 or the vehicle recognizer 20 may be installed to be exposed out of the vehicle 1, or may be installed e.g., on the external frame 2 or the windshield 3 not to be directly exposed out of the vehicle 1.

At least one vehicle controller 100 may be included in the vehicle 1. The vehicle controller 100 may have a function to perform electronic control over operation of the vehicle 1. The vehicle controller 100 may be installed in any position inside the vehicle 1 according to a selection by the designer. For example, the vehicle controller 100 may be installed between the engine room and the dashboard, or installed inside of the center fascia. The vehicle controller 100 may include at least one processor that is able to receive electric signals, handle the electric signals, and output results of handling the electric signals. The at least one processor may be implemented with at least one semiconductor chip and associated components. The at least one semiconductor chip and associated components are installed on a printed circuit board (PCB) that may be installed inside of the vehicle 1.

Figure 3:
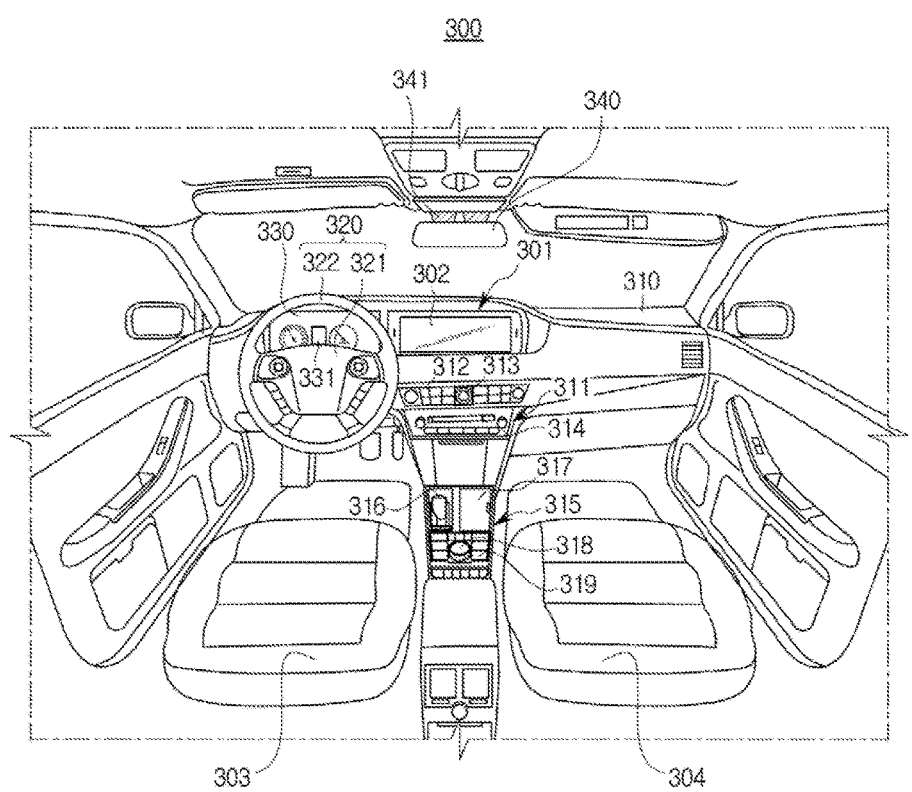
FIG. 3 shows the interior of a vehicle.

FIG. 3 shows the interior of a vehicle. In an interior 300 of the vehicle 1, there are a driver seat 303, a passenger seat 304 by the driver seat 303, a dashboard 310, a steering wheel 320, and an instrument board 321.

The dashboard 310 refers to a panel that separates the interior room from the engine room and that has various parts required for driving installed thereon. The dashboard 310 is located ahead of the driver seat 303 and passenger seat 304. The dashboard 310 may include a top panel, a center fascia 311, a gear box 315, and the like.

On the top panel of the dashboard 310, a display device for vehicle 301 may be installed. The display device for vehicle 301 may present various information in the form of images to the driver or passenger of the vehicle 1. For example, the display device for vehicle 301 may visually present various information, such as maps, weather, news, various moving or still images, information regarding status or operation of the vehicle 1, e.g., information about the air conditioner, etc. Furthermore, the display device for vehicle 301 may provide the driver or passenger with an alert corresponding to a level of danger to the vehicle 1. Specifically, if the vehicle 1 changes lanes, different alerts may be provided to the driver according to different levels of danger.

The display device for vehicle 301 may be implemented with a commonly-used navigation system. The display device for vehicle 301 may be installed inside a housing integrally formed with the dashboard 310 such that the display device for vehicle 301 may be exposed. Alternatively, the display device for vehicle 301 may be installed in the middle or the lower part of the center fascia 311, or may be installed on the inside of the windshield 3 or on the top of the dashboard 310 by means of a separate supporter (not shown). Besides, the display device for vehicle 301 may be installed at any position that may be considered by the designer.

Behind the dashboard 310, various types of devices, such as a processor, a communication module, a Global Positioning System (GPS) module, a storage, etc., may be installed. The processor installed in the vehicle 1 may be configured to control various electronic devices installed in the vehicle 1, and may serve as the vehicle controller 100. The aforementioned devices may be implemented using various parts, such as semiconductor chips, switches, integrated circuits, resistors, volatile or nonvolatile memories, PCBs, and/or the like.

The center fascia 311 may be installed in the middle of the dashboard 310, and may have input means 312 to 314 for inputting various instructions related to the vehicle 1. The input means 312 to 314 may be implemented with mechanical buttons, knobs, a touch pad, a touch screen, a stick-type manipulation device, a trackball, or the like. The driver may control many different operations of the vehicle 1 by manipulating the input means 311 to 314, 318, 319.

The gear box 315 is located below the center fascia 311 between the driver seat 303 and the passenger seat 304. In the gear box 315, a transmission 316, a container box 317, various input means 318, 319, etc., are included. The input means 318, 319 may be implemented with mechanical buttons, knobs, a touch pad, a touch screen, a stick-type manipulation device, a trackball, or the like. The container box 317 and the input means 318, 319 may be omitted in some forms.

The steering wheel 320 and an instrument panel 330 are located on the dashboard 310 in front of the driver seat 303.

The steering wheel 320 may be rotated in a certain direction according to manipulation of the driver, and accordingly, an orientation of at least one of front and rear wheels of the vehicle 1 is changed, thereby steering the vehicle 1. The steering wheel 320 includes a spoke 321 connected to a rotation shaft and a wheel for gripping 322, which is combined with the spoke 321. On the spoke, there may be an input means for inputting various instructions, and the input means may be implemented with mechanical buttons, knobs, a touch pad, a touch screen, a stick-type manipulation device, a trackball, or the like. The wheel for gripping 322 may have a radial form to be conveniently manipulated by the driver, but is not limited thereto. Inside of at least one of the spoke 321 and the wheel for gripping 322, a vibrator 201 (in FIG. 4) may be installed for allowing at least one of the spoke 321 and the wheel for gripping 322 to vibrate at a certain intensity according to an external control signal. In some forms, the vibrator 201 may vibrate at various intensities according to external control signals, and accordingly, at least one of the spoke 321 and the wheel 322 for gripping may vibrate at various intensities. With the function of the vibrator 201, the vehicle 1 may provide haptic alerts for the driver. For example, at least one of the spoke 321 and the wheel for gripping 322 may vibrate to an extent that corresponds to a level of danger determined when the vehicle 1 changes lanes. In this way, various alerts may be provided to the driver. Specifically, the higher the level of danger is, the stronger the at least one of the spoke 321 and the handle for gripping 322 vibrates to provide a high level of alert to the driver.

The instrument panel 330 is formed to provide the driver with various information relating to the vehicle 1, such as speed of the vehicle 1, engine rpm, fuel left, temperature of engine oil, flickering of turn signals, a distance traveled by the vehicle, etc. The instrument panel 330 may be implemented with lights, indicators, or the like, and it may be implemented with a display panel as well, in some forms. In the case that the instrument panel 330 is implemented with the display panel, in addition to the aforementioned information, the instrument panel 330 may display other various information such as gas mileage, whether various functions of the vehicle 1 are performed, or the like to the driver by displaying them. In some implementations, the instrument panel 330 may output and provide different alerts for the user based on different levels of danger to the vehicle 1. Specifically, if the vehicle 1 changes lanes, the instrument panel 330 may provide different alerts to the driver based on differently determined levels of danger.

Figure 4:
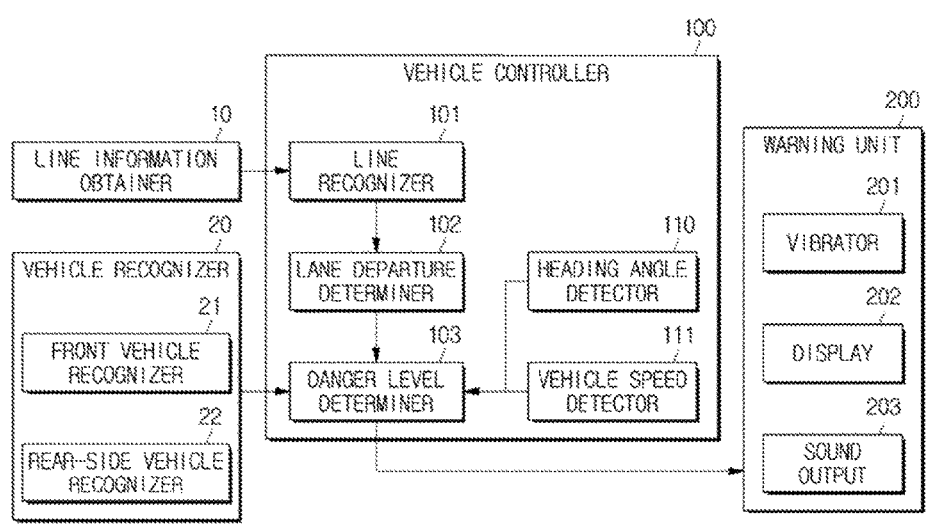
FIG. 4 is a block diagram of a vehicle.

FIG. 4 is a block diagram of a vehicle. The vehicle 1 may include a line information obtainer 10, a vehicle recognizer 20, a vehicle controller 100, and a warning unit 200.

The line information obtainer 10, vehicle recognizer 20, vehicle controller 100, and warning unit 200 are electrically coupled with one another to exchange data. For this, a cable or circuitry may be used to connect the line information obtainer 10, vehicle recognizer 20, vehicle controller 100, and warning unit 200 to one another to exchange data. Alternatively, a wireless communication module for implementing a wireless communication network may be used to connect them to one another to exchange data.

The cable may include e.g., a pair cable, a coaxial cable, a fiber-optic cable, an Ethernet cable, etc.

The wireless communication module may include a short-range communication module, a mobile communication module, etc. The short-range communication refers to a device for performing short-range communication within a certain distance, and may include Wireless Local Area Network (WLAN), Wi-Fi, Bluetooth, Zigbee, Wi-Fi Direct (WFD), Ultra Wideband (UWB), Infrared Data Association (IrDA), Bluetooth Low Energy (BLE), Near Field Communication (NFC), etc.

The mobile communication module refers to a device configured to perform communication over a wireless communication network based on various mobile communication standards, such as 3GPP, 3GPP2, or WiMax series.

In addition, other various communication schemes and means may be used for the line information obtainer 10, vehicle recognizer 20, vehicle controller 100, and warning unit 200 to exchange data with one another.

Figure 5:
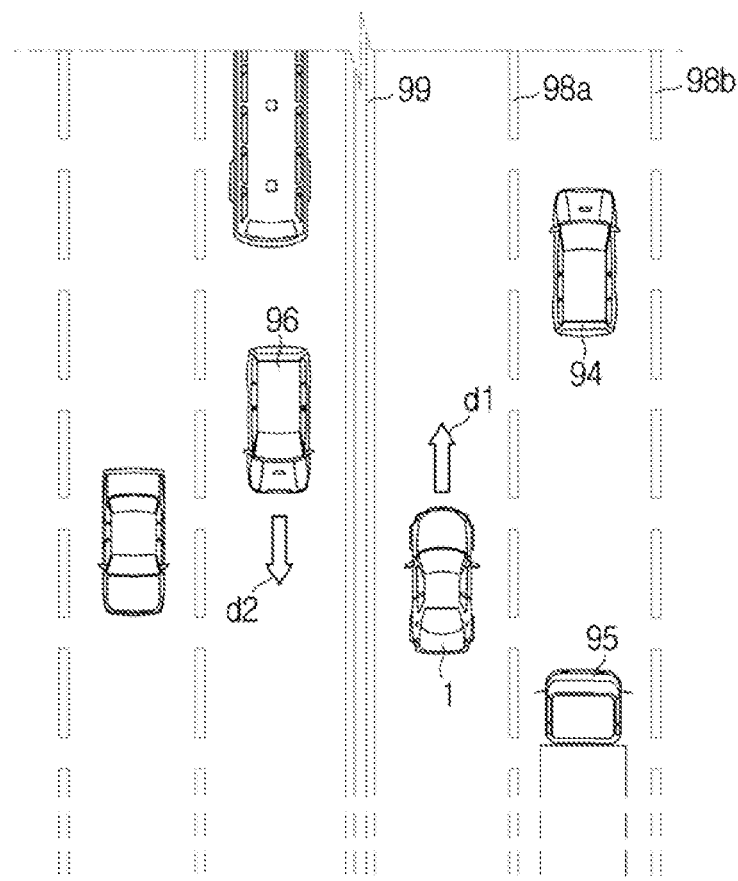
FIG. 5 is an example of a road on which vehicles are driving.
Figure 6:
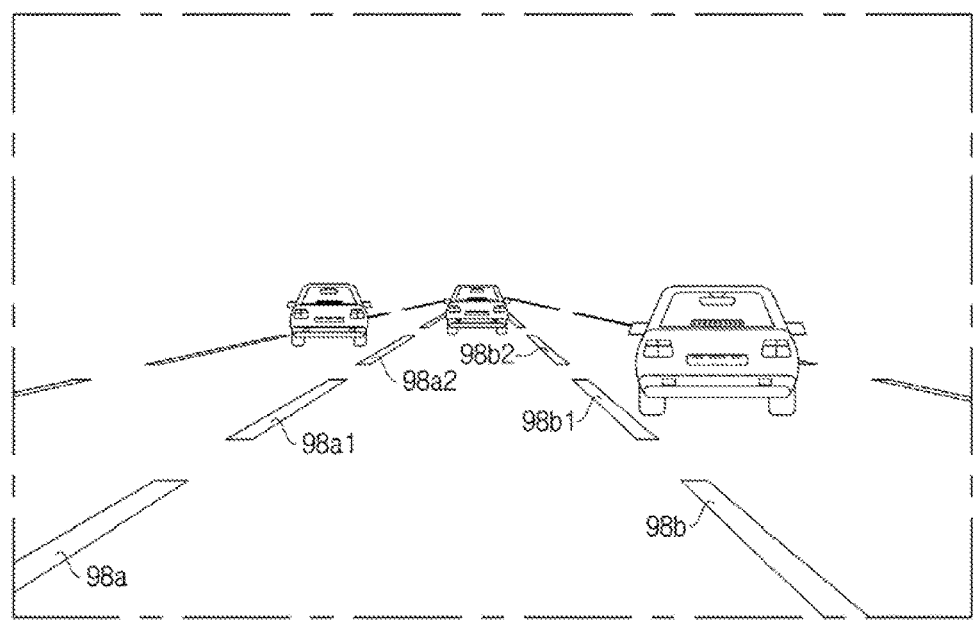
FIG. 6 is a view for explaining a line recognition process.

FIG. 5 is an example of a road on which vehicles are driving, and FIG. 6 is a view for explaining a line recognition process. The line information obtainer 10 may collect information regarding lines and recognize the lines as required. The line information obtainer 10 may be installed at a position at which information regarding a condition ahead of the vehicle 1 may be easily acquired, e.g., on the inner side sp1 of the windshield 3 or on the inner side sp2 of the radiator grill 6. In addition, the line information obtainer 10 may be installed at other various positions at which lines may be easily recognized.

Referring to FIG. 5, the vehicle 1 may move on the road, and if the road is a paved road, at least one line 97 may be marked on the road. The line 97 may include a center line 99 and driving lines 98a, 98b. The center line 99 divides the road into two, one for vehicles (e.g., 1) moving in one direction d1 and the other one for vehicles (e.g., 96) moving in the opposite direction d2. The driving lines 98a, 98b separates lanes for vehicles (e.g., 1, 94, 95) moving in the same direction (e.g., d1) to guide the vehicles to travel safely and swiftly on the road.

The line information obtainer 10 may collect information about the lines 97 drawn on the road by obtaining information regarding a condition ahead of the vehicle 1.

In some forms, the line information obtainer 10 may take a picture of the forward direction of the vehicle 1 to obtain image data of the forward direction, as shown in FIG. 6. The image data as herein used may be still image data or moving image data. The line information obtainer 10 may be implemented with a camera for creating an image by collecting visible rays or infrared rays incident from ahead of the vehicle 2. The camera may include a Lane Departure Warning System Camera (LDWS). The camera may be implemented with a monocular camera or a binocular camera.

The line information obtainer 10 may obtain image data in predetermined cycles. The predetermined cycle may be 1/30, 1/24, 1/12, 1 second, or the like, which may be arbitrarily determined by the designer.

Lines 97 may be recognized based on the image data obtained by the line information obtainer 10. Specifically, in the image data obtained by the line information obtainer 10, there is a part showing at least one line 98a, 98a1, 98a2, 98b, 98b1. The lines may be recognized by extracting the part showing the lines 98a, 98a1, 98a2, 98b, 98b1 from the image data. In some forms, in order to extract the part showing the lines 98a, 98a1, 98a2, 98b, 98b1, feature points may be extracted in the image, and the part showing the lines 98a, 98a1, 98a2, 98b, 98b1 may then be extracted based on the extracted feature points. Specifically, feature points that may correspond to corners or edges of the lines 98a, 98a1, 98a2, 98b, 98b1 from the extracted feature points, and the part showing the lines 98a, 98a1, 98a2, 98b, 98b1 may be extracted in the image by calculating or comparing existing data of lines based on the extracted feature points. Once the part showing the lines 98a, 98a1, 98a2, 98b, 98b1 are extracted, the shape, orientation, or actual location of the lines 98a, 98a1, 98a2, 98b, 98b1 may be determined based on the extracted part.

The line information obtainer 10 may recognize the lines 98a, 98a1, 98a2, 98b, 98b1 from multiple pieces of image data obtained in the predetermined cycles. In this case, the line information obtainer 10 may determine how the vehicle 1 is moving, based on the recognition results of the lines 98a, 98a1, 98a2, 98b, 98b1 obtained from the respective image data.

Although it was described that the line information obtainer 10 recognizes the lines 98a, 98a1, 98a2, 98b, 98b1, a process of recognizing the lines 98a, 98a1, 98a2, 98b, 98b1 may be performed by a line recognizer 101 included in the vehicle controller 100 in another form.

In the case the line information obtainer 10 recognizes the lines 98a, 98a1, 98a2, 98b, 98b1, the line recognition results may be sent to the vehicle controller 100. Specifically, the results may be sent to a lane departure determiner 102 or a danger level determiner 103 included in the vehicle controller 100.

Otherwise, if the line recognizer 101 performs the process of recognizing the lines 98a, 98a1, 98a2, 98b, 98b1, the image data obtained by the line information obtainer 10 may first be sent to the line recognizer 101 of the vehicle controller 100, and the line recognizer 101 may then recognize lines on the road using the received image data. The result of recognizing lines performed by the line recognizer 101 may be sent to the danger level determiner 103.

The vehicle recognizer 20 may determine whether there is another car around the vehicle 1. The vehicle recognizer 20 may be installed at a location at which another car may be easily recognized, and more specifically, installed at multiple positions sp2 to sp4 on the vehicle 1 such that the vehicle recognizer 20 is able to recognize other vehicles located in different directions. For example, the vehicle recognizer 20 may be installed on the inner side sp2 of the radiator grill 6, around the number plate, on the C pillar or rear fender, or any other position. The vehicle recognizer 20 installed at each position may recognize another vehicle located in a direction corresponding to the position.

The vehicle recognizer 20 may include at least one front vehicle recognizer 21 and at least one rear-side vehicle recognizer 22.

Figure 7:
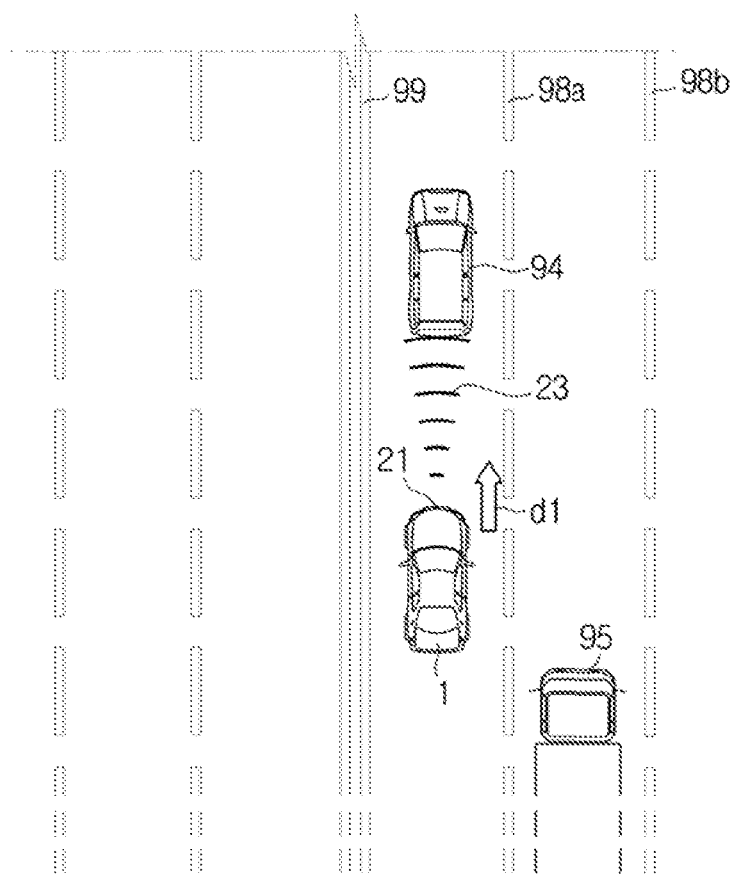
FIG. 7 is a view for explaining operation of a front vehicle recognizer.

FIG. 7 is a view for explaining operation of a front vehicle recognizer.

The front vehicle recognizer 21 may recognize whether an object, e.g., a pedestrian or another vehicle 94 is present or approaching ahead of the vehicle 1. The front vehicle recognizer 21 is installed on the front of the vehicle 1 to appropriately recognize a vehicle, e.g., 94 ahead of the vehicle 1. For example, the front vehicle recognizer 21 may be installed on the inner side sp1 of the windshield 3, on a part of the radiator grill 6, on the front fender, around the front number plate, or the like. While some examples of the front vehicle recognizer 21 being installed were described above, the position at which the vehicle recognizer 21 is installed is not limited thereto. Besides, the front vehicle recognizer 21 may be installed at any other position that may be considered by the designer.

The front vehicle recognizer 21 may recognize whether another vehicle 94 is present or approaching ahead of the vehicle 1, by using electromagnetic waves or laser beams. For example, as shown in FIG. 7, the front vehicle recognizer 21 may irradiate electromagnetic waves 23, such as microwaves or millimeter waves toward the forward direction, and determine whether an object is present or approaching in front of the vehicle 1 by receiving electromagnetic waves reflected from the object located ahead e.g., another vehicle 94. In this case, the front vehicle recognizer 21 may further determine a distance between the vehicle 1 and the object by using a return time taken to return the electromagnetic waves. In some forms, the front vehicle recognizer 21 may emit pulsed laser beams, ultrasounds or infrared rays toward the forward direction, and determine whether there is an object located ahead by receiving the pulsed laser beams, ultrasounds or infrared rays reflected or scattered from the object. Furthermore, the front vehicle recognizer 21 may determine whether there is an object located ahead by receiving visible rays reflected or scattered from the object. Depending on which one of pulsed laser beams, ultrasounds, infrared rays, and visible rays is used, the front vehicle recognizer 21 may obtain different results of recognizing a distance to the vehicle 94 located ahead, or the weather condition or brightness may differently influence to recognizing the vehicle 94.

In this way, when the vehicle 1 is moving along a lane in a certain direction d1, the vehicle 1, specifically the vehicle controller 100 of the vehicle 1 may determine whether another vehicle 94 is present or approaching ahead of the vehicle 1 in the same lane, or determine a distance to the other vehicle 94.

The front vehicle recognizer 21 may be implemented with a radar using millimeter waves or micro waves, a light detection and ranging (Lider) using pulsed laser beams, a vision using visible rays, an infrared sensor using infrared rays, an ultrasound sensor using ultrasounds, and/or the like. The front vehicle recognizer 21 may be implemented with any one of them or any combination of them.

Figure 8:
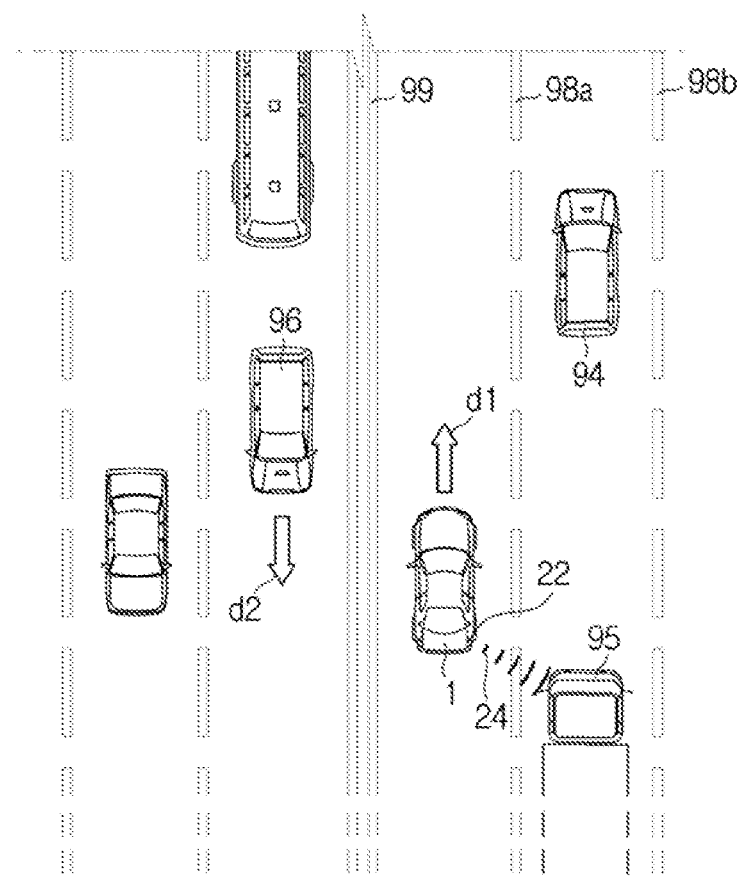
FIG. 8 is a view for explaining operation of a rear-side vehicle recognizer.

FIG. 8 is a view for explaining operation of a rear-side vehicle recognizer.

The rear-side vehicle recognizer 22 may recognize whether an object, e.g., a pedestrian or another vehicle 95 is present or approaching from the side of the vehicle 1, or behind the vehicle 1, or from a direction between either side and rear (hereinafter, referred to as rear-side) of the vehicle 1.

The rear-side vehicle recognizer 22 may be installed at a proper position at which an object located to a side, behind, or to a rear-side of the vehicle 1 may be recognized, as shown in FIGS. 1 and 2.

In some forms, the rear-side vehicle recognizer 22 may be installed on both sides of the vehicle 1 to recognize objects located both in a direction between the left side and rear of the vehicle 1 and in a direction between the right side and the rear of the vehicle 1. For example, a first or second rear-side vehicle recognizer 22a or 22b may be mounted on the left side of the vehicle 1, and a third or fourth rear-side vehicle recognizer 22c or 22d may be mounted on the right side of the vehicle 1.

Furthermore, in some forms, the rear-side vehicle recognizer 22 may be installed in many different positions to appropriately recognize other vehicles. For example, the first and second rear-side vehicle recognizer 22a and 22b may be installed on a left C pillar of the vehicle 1 and at a left location on the rear fender, respectively, to each recognize whether a pedestrian or another vehicle 95 is present or approaching. Similarly, the third and fourth rear-side vehicle recognizer 22c and 22d may be installed on a right C pillar of the vehicle 1 and at a right location on the rear fender, respectively, to each recognize whether a pedestrian or another vehicle 95 is present or approaching.

Although examples of the rear-side vehicle recognizer 22 being installed were described, the position at which the rear-side vehicle recognizer 22 is installed is not limited thereto, but the rear-side vehicle recognizer 22 may be installed in other various positions on the vehicle 1, e.g., around the rear lamp of the vehicle 1.

The rear-side vehicle recognizer 22 may recognize whether another vehicle 95 is present or approaching from the left side, right side, rear-left side, or rear-right side using electromagnetic waves or laser beans. For example, as shown in FIG. 8, the rear-side vehicle recognizer 22 may emit electromagnetic waves such as micro waves or millimeter waves, pulsed laser beams, ultrasounds, infrared rays 24, or the like in the left or right direction, in the rear direction, in the rear-left or rear-right direction, and determine whether an object is present on the left or right, in the back, or on the rear-left or rear-right side by receiving electromagnetic waves, pulsed laser beams, ultrasounds, infrared rays, or the like, reflected or scattered from the object. In this case, the rear-side vehicle recognizer 22 may use return time taken to return the electromagnetic waves, pulsed laser beams, ultrasounds, infrared rays 24, or the like, to further determine a distance to the object. In some forms, the rear-side vehicle recognizer 22 may determine whether there is an object located in the left or right direction, in the rear direction, in the rear-left or rear-right direction by receiving visible rays reflected or scattered from the object. As described above, depending on which one of electromagnetic waves, pulsed laser beams, ultrasounds, infrared rays, and visible rays is used, the rear-side vehicle recognizer 22 may obtain different results of recognizing a distance to the vehicle 95 located in the left or right direction, in the rear direction, in the rear-left or rear-right direction of the vehicle 1, or the weather condition or brightness may differently influence to recognizing the vehicle 95.

Using this, while the vehicle 1 is moving in the direction d1 in a lane, the vehicle 1, specifically, the vehicle controller 100 of the vehicle 1 may determine whether the other vehicle 95 is present in the left or right direction, in the rear direction, in the rear-left or rear-right direction of the vehicle 1 in another lane.

The rear-side vehicle recognizer 22 may be implemented with many different devices, such as a radar using millimeter waves or micro waves, a Lider using pulsed laser beams, a vision using visible rays, an infrared sensor using infrared rays, an ultrasound sensor using ultrasounds, and/or the like. The rear-side vehicle recognizer 22 may be implemented with any one of them or any combination of them. If multiple rear-side vehicle recognizers 22 may be mounted on the single vehicle 1, the respective rear-side vehicle recognizers 22 may be implemented with the same type or different types of devices. For example, the rear-side vehicle recognizers 22a, 22c mounted on the C pillar may be implemented with Liders, and the rear-side vehicle recognizers 22b, 22d mounted on the rear fender may be implemented with ultrasound sensors or infrared sensors. The rear-side vehicle recognizer 22 may also be implemented with other various devices or combinations of them that may be considered by the designer.

As described above, the vehicle controller 100 may be implemented with semiconductor chips, PCBs, and/or the like located at a particular location, e.g., between the engine room and the dashboard, and may use data sent from at least one of the line information obtainer 10 and the vehicle recognizer 20 to determine whether the vehicle 1 is moving out of a lane and a level of danger due to the lane departure.

Specifically, the vehicle controller 100 may include the line recognizer 101, the lane departure determiner 102, and the danger level determiner 103.

The line recognizer 101 may recognize the line 97 by extracting lines from image data sent from the line information obtainer 10. The line recognizer 101 may recognize the line 97 in the same method as used in the line information obtainer 10. Specifically, as described in connection with FIG. 6, the line recognizer 101 may recognize a line on the road by extracting a part showing lines 98a, 98a1, 98a2, 98b, 98b1 from the image data sent from the line information obtainer 10. In some forms, the line recognizer 101 may recognize the lines 98a, 98a1, 98a2, 98b, 98b1 on the road by extracting feature points in the image.

The line recognizer 101 may recognize the lines 98a, 98a1, 98a2, 98b, 98b1 from multiple pieces of image data obtained by the line information obtainer 10 in predetermined cycles. In this case, the line recognizer 101 may determine how the vehicle 1 is moving, based on recognition results of the lines 98a, 98a1, 98a2, 98b, 98b1 obtained from the respective image data. For example, the line recognizer 101 may determine whether the vehicle 1 is moving along the line 98a, 98a1, 98a2, 98b, 98b1, or moving askew toward a particular line 98a, 98a1, 98a2, 98b, 98b1.

The lane departure determiner 102 may determine whether the vehicle 1 has deviated from a lane based on the recognized line 98a, 98a1, 98a2, 98b, 98b1. Specifically, the lane departure determiner 102 may determine whether the vehicle 1 is crossing, has crossed, or is about to cross the line based on the location, orientation, or moving pattern of the line 98a, 98a1, 98a2, 98b, 98b1 recognized using the multiple pieces of image data.

If it is determined that the vehicle 1 has crossed the line 98a, 98a1, 98a2, 98b, 98b1, the lane departure determiner 102 may inform the danger level determiner 103 that the vehicle 1 has crossed the line.

Figure 9:
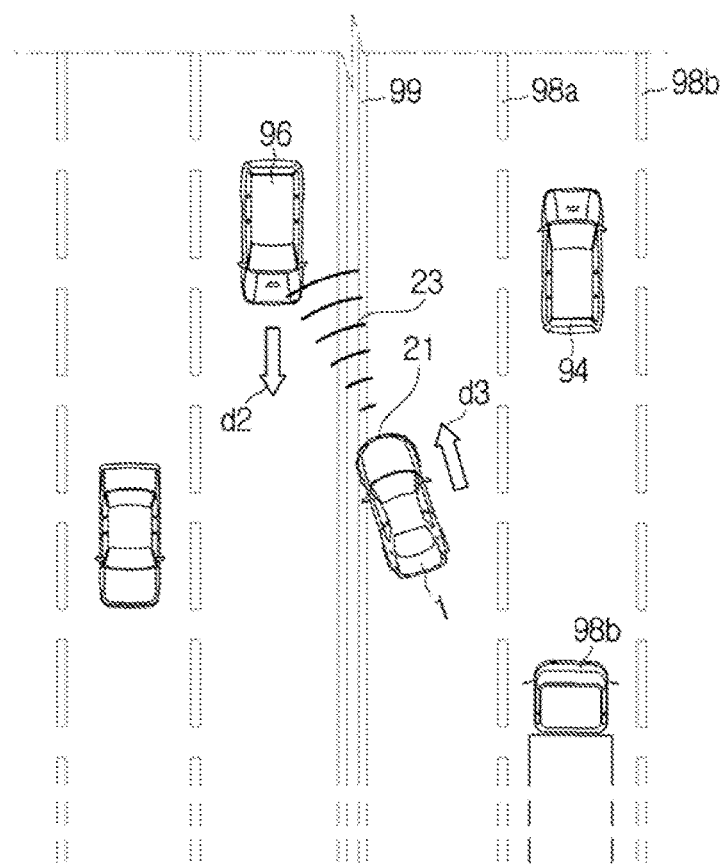
FIG. 9 is a view for explaining an occasion where a vehicle crosses the center line.
Figure 10:
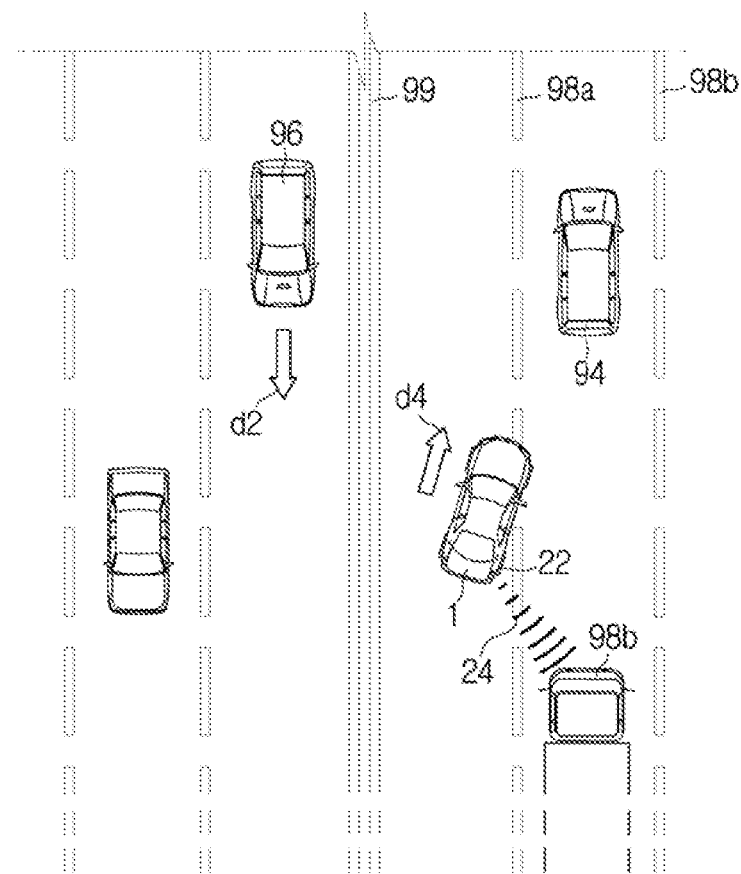
FIG. 10 is a view for explaining an occasion where there is another vehicle behind a vehicle while the vehicle is moving out of a lane.
Figure 11:
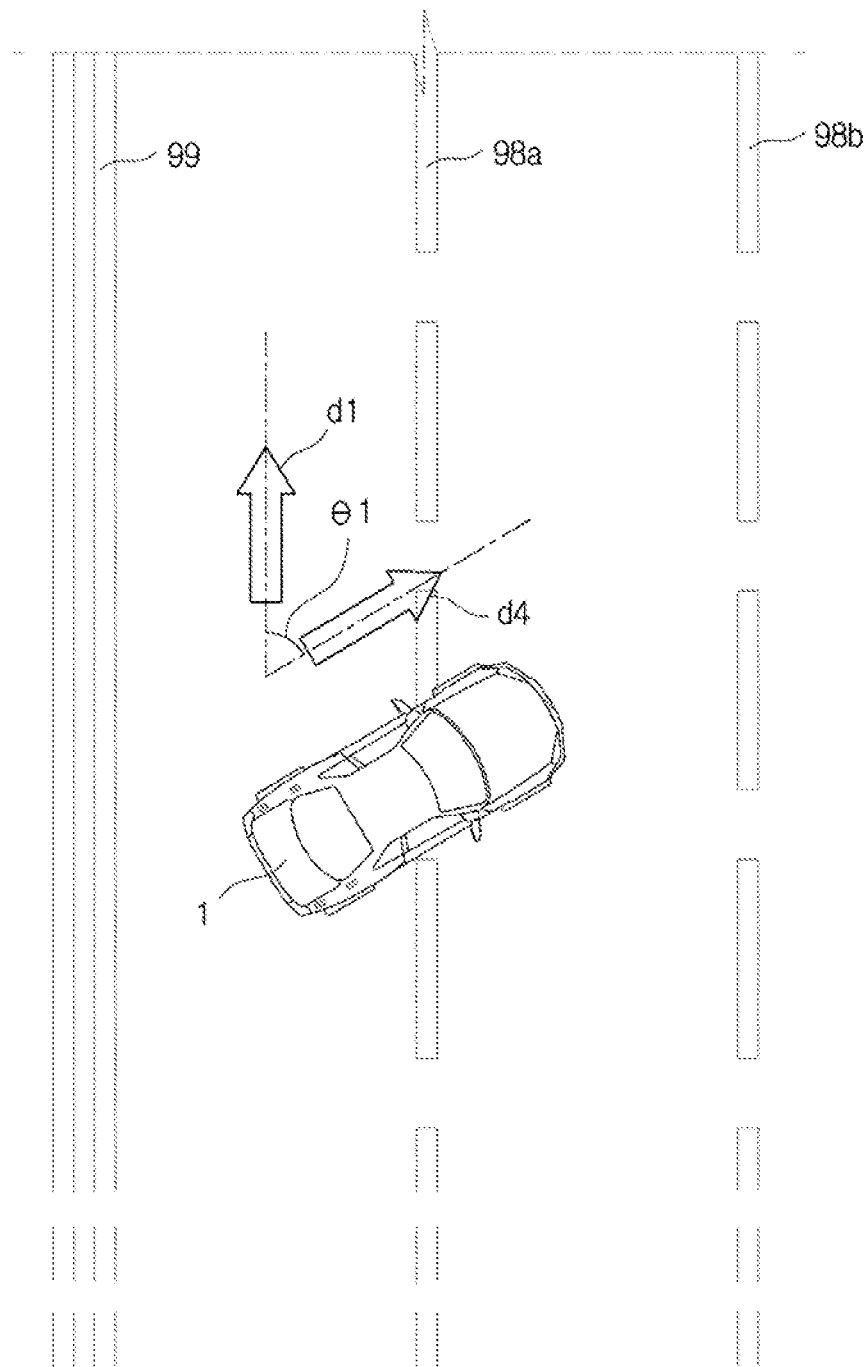
FIG. 11 is a view for explaining an occasion where a vehicle is moving out of a lane at a relatively large heading angle.
Figure 12:
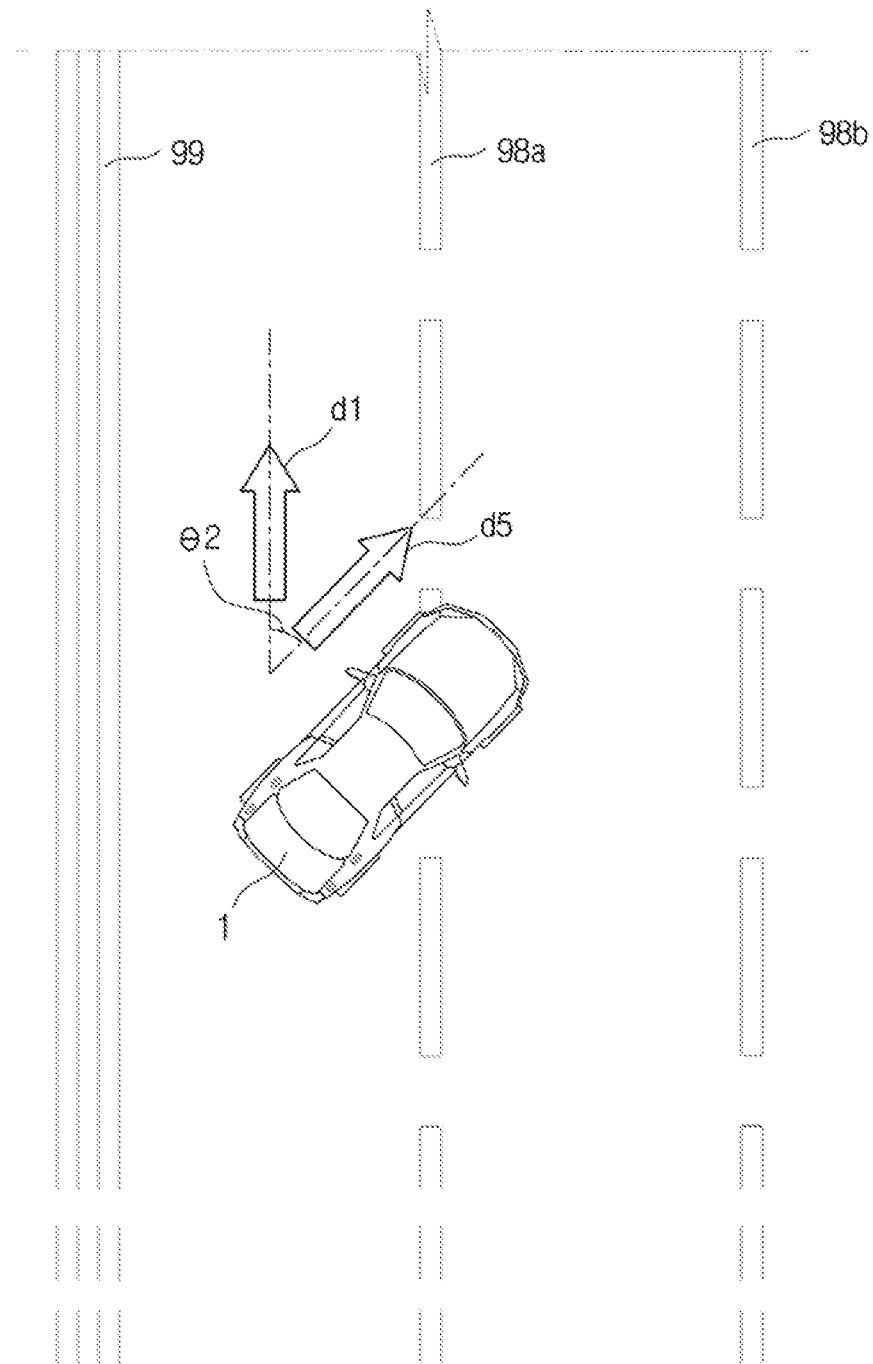
FIG. 12 is a view for explaining an occasion where a vehicle is moving out of a lane at a relatively small heading angle.

FIG. 9 is a view for explaining an occasion where a vehicle crosses the centerline, and FIG. 10 is a view for explaining an occasion where there is a car behind a vehicle that is crossing a line. FIG. 11 is a view for explaining an occasion where a vehicle is moving out of a lane at a relatively large heading angle, and FIG. 12 is a view for explaining an occasion where a vehicle is moving out of a lane at a relatively small heading angle.

The danger level determiner 103 may determine a level of danger to the vehicle 1 based on at least one of a condition around the vehicle 1 and a behavior of the vehicle 1 while the vehicle 1 is crossing the line 98a, 98a1, 98a2, 98b, 98b1 (or moving out of a lane).

The level of danger indicates an extent of danger to the vehicle 1 when the vehicle 1 changes lanes. For example, the level of danger may be defined according to at least one of probability of the vehicle 1 getting into accidents if the vehicle 1 changes lanes and the gravity of the possible accident. For example, the level of danger may be defined according to how high the probability of the vehicle 1 getting into accidents, such as crashing into another vehicle 94, 95, 96 or into a construction on the road, such as a guardrail is, or may be determined based on how high the probability of the vehicle 1 getting into accidents is due to a sudden lane change.

The level of danger may also be defined using a condition around the vehicle 1 or behavior of the vehicle 1 while the vehicle 1 is changing the lane. For example, the level of danger may be defined based on whether another vehicle is present around the vehicle 1 or the speed of the vehicle 1 while the vehicle 1 is changing lanes.

The level of danger may be subdivided into multiple levels as required. For example, the level of danger may be divided into first, second, and third levels of danger. In this case, a particular level of danger, e.g., the first level of danger may be defined to be more dangerous than the other levels of danger, e.g., the second level of danger. For example, the first level of danger is more dangerous than the second level of danger, which is more dangerous than the third level of danger. In this case, the first level of danger indicates a high level of danger, the second level of danger indicates a middle level of danger, and the third level of danger indicates a low level of danger or almost no danger. The way of subdividing the level of danger is not limited thereto. The designer may subdivide the level of danger into more levels as required or according to an arbitrary selection.

Each level of danger may be defined according to an arbitrary selection by the designer based on a condition around the vehicle 1 or behavior of the vehicle 1 while the vehicle 1 is changing the lane. For example, the designer may define the first level of danger to indicate an occasion (d3) where the vehicle 1 is violating the center line 99 while another vehicle 96 is approaching the vehicle 1 from the opposite direction, as shown in FIG. 9, or to indicate an occasion (d4) where the vehicle 1 is crossing the driving line 98a to enter a neighboring lane while other vehicles 94, 95 are moving on the neighboring lane, and thus there is the risk of collision, as shown in FIG. 10. Furthermore, the designer may define the second level of danger to indicate an occasion (d5) where the vehicle is crossing the driving line 98a at an excessively high speed or at an excessively large heading angle to enter a neighboring lane, as shown in FIG. 11. Moreover, the designer may define the third level of danger to indicate an occasion (d6) where the vehicle is crossing the driving line 98a under a certain speed or at a small enough heading angle to enter a neighboring lane, as shown in FIG. 12. In addition, the designer may define more levels of danger taking into account various occasions that may be experienced by the vehicle 1 if the vehicle 1 deviates from a lane.

With the level of danger as defined above, the danger level determiner 103 may collect information regarding a surrounding condition or information regarding a behavior of the vehicle 1 while the vehicle is deviating from the lane, and may determine a level of danger based on the collected information.

The vehicle controller 100 may further include at least one of a heading angle detector 110 and a vehicle speed detector 111.

The heading angle detector 110 may detect an heading angle of the vehicle 1. The heading angle refers to an angle between a reference direction and a direction in which the vehicle 1 is moving forward, the reference direction being defined as a particular direction. For example, as shown in FIGS. 11 and 12, if the reference direction is defined as the lane direction d1, the heading angle corresponds to an angle θ1, θ2 between the lane direction d1 and the direction in which the vehicle 1 is moving forward d3, d4.

The heading angle detector 110 may determine the heading angle based on various data, such as degrees that the steering wheel 320 of FIG. 3 turns, a moving direction of the vehicle 1 detected by the GPS, line information obtained by the line information obtainer 10, and/or the like. The detected information about the heading angle may be sent to the danger level determiner 103.

The vehicle speed detector 111 may measure a moving speed of the vehicle 1. The vehicle speed detector 111 may use a vehicle speed sensor, GPS, or the like to detect the speed of the vehicle 1. The vehicle speed sensor as herein used refers to a sensor to measure the speed of the vehicle 1 by detecting rotation of the output shaft of the transmission. The vehicle speed detector 111 may measure the speed of the vehicle 1 by irradiating laser beams or ultrasounds to the ground. The speed detected by the vehicle speed detector 111 may be sent to the danger level determiner 103.

The danger level determiner 103 may determine a level of danger to the vehicle 1 based on at least one of the heading angle received from the heading angle detector 110 and the speed of the vehicle 1 received from the vehicle speed detector 111, if it is determined that the vehicle 1 has crossed the line 97.

In some forms, the danger level determiner 103 may use at least one of the heading angle received from the heading angle detector 110 and the speed of the vehicle 1 received from the vehicle speed detector 111, depending on whether the vehicle recognizer 20 has recognized a vehicle. Specifically, the danger level determiner 103 may determine a level of danger to the vehicle 1 based on at least one of the heading angle received from the heading angle detector 110 and the speed of the vehicle 1 received from the vehicle speed detector 111, if the vehicle recognizer 20 fails to recognize another vehicle 94, 95, 96, and may determine a level of danger to the vehicle 1 without using the heading angle received from the heading angle detector 110 and the speed of the vehicle 1 received from the vehicle speed detector 111, if the vehicle recognizer 20 has recognized another vehicle 94, 95, 96.

The line recognizer 101, lane departure determiner 102, danger level determiner 103, heading angle detector 110, and vehicle speed detector 111 of the vehicle controller 100 may be implemented with at least one processor. For example, the line recognizer 101, lane departure determiner 102, danger level determiner 103, heading angle detector 110, and vehicle speed detector 111 of the vehicle controller 100 may all be implemented with a single processor, or may be implemented with respective processors. In another example, some of the line recognizer 101, lane departure determiner 102, danger level determiner 103, heading angle detector 110, and vehicle speed detector 111 may be implemented with one processor while the other of them may be implemented with another processor. In the latter case, the respective processors may be configured to exchange data through a circuit, cable, or wireless communication module.

After determining a level of danger based on information regarding a surrounding condition or behavior of the vehicle 1 while the vehicle 1 is crossing the line (or moving out of a lane), the danger level determiner 103 may send a control signal corresponding to the determined level of danger to the warning unit 200 in the form of an electric signal.

The warning unit 200 may provide an alert corresponding to the level of danger to the driver, based on the control signal sent from the vehicle controller 100, specifically, from the danger level determiner 103.

Specifically, the warning unit 200 may provide the driver with a first level of alert corresponding to the first level of danger, a relatively high level of danger, and may provide the driver with a second level of alert corresponding to the second level of danger, which is lower than the first level of danger. In this case, the first level of alert may be set up to be stronger than the second level of danger, to provide more awareness to the driver. If the level of danger corresponds to the third level of danger, which is a relatively low level of danger, the warning unit 200 may provide a third level of alert to the driver, which corresponds to the third level of danger. Likewise, the third level of danger may be set up to be weaker than the first or second level of danger, to alleviate inconvenience to the driver.

The warning unit 200 may include at least one of e.g., a vibrator 201, a display 202, and a sound output 203.

The vibrator 201 may vibrate a vibrating substance according to the received control signal. The vibrator 201 may vibrate the vibrating substance using a vibration motor or an electromagnet. The vibrating substance herein used may include e.g., the spoke 321 or wheel for gripping 322 of the steering wheel 320, in which case, the vibrator 201 may be located inside the spoke 321 or wheel for gripping 322 to vibrate the spoke 321 or wheel for gripping 322. The vibrator 201 may vibrate with various intensities according to the control signal. Specifically, if the control signal corresponds to the first level of danger, the vibrator 201 may more intensely vibrate to provide the first level of alert that corresponds to the first level of danger. If the control signal corresponds to the second level of danger, the vibrator 201 may less intensely vibrate than for the case of providing the first level of alert, to provide the second level of alert that corresponds to the second level of danger. If the control signal corresponds to the third level of danger, the vibrator 201 may less intensely vibrate than for the respective cases of providing the first and second levels of alert, to provide the third level of alert that corresponds to the third level of danger.

The display 202 may output a warning message on the screen according to the received control signal. The display 202 may be implemented by the display device for vehicle 301, or the instrument panel 330. The display 202 may output and provide different warning messages to the user according to the control signal. For example, the display 202 may output different warning messages indicating different contents, e.g., very dangerous, dangerous, or safe, to correspond to different levels of danger. The display 202 may also output and provide the warning message to the user in different ways according to the control signal. For example, the display 202 may output warning messages in different colors according to the different levels of danger. In addition, the display 202 may deliver a warning message by outputting text in a size corresponding to the received level of danger, or may deliver the warning message by repeatedly flickering light as many times as it corresponds to the received level of danger. The display 202 may output different warning messages according to different levels of danger in various ways.

The sound output 203 may output a warning message or warning sound in a voice according to the received control signal. The sound output 203 may use a human voice recorded in advance to output the warning message. A type of the warning sound output from the sound output 203 may be determined or changed by the designer or the driver. The sound output 203 may be implemented by a speaker for vehicle directly installed in the vehicle 1 or a speaker equipped in the display device for vehicle 301. The sound output 203 may output and provide different warning messages according to the control signal, or a warning message in different ways according to the control signal. For example, the sound output 203 may output different warning messages indicating e.g., safe, dangerous, or very dangerous, as the level of danger increases. Furthermore, the sound output 203 may output different types of warning sound according to different levels of danger. In addition, the sound output 203 may output the warning sound by increasing the sound volume as the level of danger increases.

In some forms, the warning unit 200 may provide an alert to the driver by operating more devices as the level of danger increases. For example, if it is determined that the level of danger corresponds to the first level of danger and accordingly, the first level of alert is required, the vibrator 201, display 202, and sound output 203 of the warning unit 200 may all operate to provide an alert to the user. If it is determined that the level of danger corresponds to the third level of danger, only the vibrator 201 and display 202 of the warning unit 200 may operate to provide an alert to the user.

Furthermore, in some implementations, the warning unit 200 may provide an alert to the user by operating more devices as the level of danger increases while operating one of them more intensely. For example, if it is determined that the level of danger corresponds to the first level of danger and accordingly, the first level of alert is required, the vibrator 201, display 202, and sound output 203 of the warning unit 200 may all operate while the vibrator 201 vibrates more intensely, to provide an alert to the user. If it is determined that the level of danger corresponds to the second level of danger, which is a relatively low level of danger and accordingly, the second level of alert is required, the vibrator 201, display 202, and sound output 203 of the warning unit 200 may all operate while the vibrator 201 vibrates less intensely than for an occasion of providing the first level of alert. Likewise, if it is determined that the level of danger corresponds to the third level of danger, which is an even lower level of danger and accordingly, the third level of alert is required, only the vibrator 201 and display 202 of the warning unit 200 may operate while the vibrator 201 vibrates even less intensely than for an occasion of providing the first level of alert, to provide an alert for the user. Accordingly, the driver may be warned of different levels of danger, and may be able to manipulate the vehicle 1 by instantaneously determining the level of danger. This may significantly lower the risk of the vehicle 1 getting into accidents.

Referring to FIGS. 9 to 12, an example where the vehicle controller 100 determines the level of danger and provides an alert to the driver by controlling the warning unit 200 according to the determined level of danger will now be described.

While the vehicle 1 is driving on the road, the line information obtainer 10 of the vehicle 1 may obtain image data about a condition ahead of the vehicle 1, and the line recognizer 101 may recognize lines using the image data. In this case, as shown in FIGS. 9 and 10, while the vehicle 1 is moving out of the current lane separated by the lines 97, the lane departure determiner 102 may determine that the vehicle 1 has moved out of the lane, and the danger level determiner 103 may determine a level of danger due to the lane departure.

If, as shown in FIG. 9, the front vehicle recognizer 21 detects another vehicle 96 approaching ahead of the vehicle 1, the danger level determiner 103 may determine that the level of danger is very high because the vehicle 99 has violated the center line 99. Specifically, the danger level determiner 103 determines the level of danger corresponds to the first level of danger, and generates and sends a control signal to output the first level of alert to the warning unit 200. The warning unit 200 outputs the first level of alert according to the control signal. As described above, the first level of alert may come into effect by operating multiple devices 201 to 203 or by having at least one device 201, 202, or 203 operate with more energy consumption.

If, as shown in FIG. 10, the rear-side vehicle recognizer 22 detects another vehicle 95 present in the rear-side direction of the vehicle 1, the danger level determiner 103 may determine that the level of danger is very high. Specifically, the danger level determiner 103 may determine that the danger level to the vehicle 1 corresponds to the first level of danger because the vehicle 1 might be likely to collide with the other vehicle 95 from the rear-side direction, and accordingly, may generate and send a control signal to output the first level of alert to the warning unit 200. The warning unit 200 outputs the first level of alert according to the control signal. As described above, the first level of alert may come into effect by operating multiple devices 201 to 203 or by having at least one device 201, 202, or 203 operate with more energy consumption.

If, as shown in FIGS. 11 and 12, the vehicle 1 is crossing the line 97 but the front vehicle recognizer 21 or the rear-side vehicle recognizer 22 recognizes no vehicle ahead or from the rear-side direction of the vehicle 1, the danger level determiner 103 may determine the level of danger based on the heading angle or the speed of the vehicle 1.

As shown in FIG. 11, the danger level determiner 103 may compare the heading angle $\theta 1$ of the vehicle 1, i.e., an angle between the lane direction d1 and the direction d3 in which the vehicle 1 is moving forward, with a predetermined threshold angle, and if the heading angle $\theta 1$ of the vehicle 1 is greater than the threshold angle, the danger level determiner 103 may determine the level of danger to be the second level of danger, indicating a medium level of danger. That is, since the vehicle 1 is making a sudden change of lane, crossing over the line 98a, leading to some dangerous situations for the vehicle 1 although there is no cars e.g., 95 around the vehicle 1, the danger level determiner 103 may determine that the danger level corresponds to the second level of danger, and accordingly, generate and send the second level of alert to the warning unit 200. The threshold angle as herein used may be arbitrarily determined by the designer. For example, the threshold angle may be selected from among angles between 30 degrees and 90 degrees. In some forms, the danger level determiner 103 may determine the level of danger based on the moving speed of the vehicle 1 instead of the heading angle θ1. In this case, if the moving speed of the vehicle 1 is faster than a threshold speed, it may be determined that the level of danger is high. The threshold speed as herein used may be arbitrarily determined by the designer. Furthermore, the danger level determiner 103 may determine the level of danger, taking into account a combination of the heading angle θ1 and the moving speed of the vehicle 1. The warning unit 200 outputs the second level of alert according to the control signal. As described above, the second level of alert may come into effect by operating one or more devices 201 to 203 or by having at least one device 201, 202, or 203 operate with relatively less energy consumption.

As shown in FIG. 12, the danger level determiner 103 may compare the heading angle θ2 of the vehicle 1, i.e., an angle between the lane direction d1 and the direction d4 in which the vehicle 1 is moving forward, with a predetermined threshold angle, and if the heading angle θ2 of the vehicle 1 is smaller than the threshold angle, the danger level determiner 103 may determine the level of danger to be the third level of danger. In other words, the danger level may be determined to be a low level of danger because no vehicle e.g., 95 is present around the vehicle 1 and the vehicle 1 is not making a sudden lane change. In some forms, the danger level determiner 103 may determine the level of danger based on the moving speed of the vehicle 1 instead of the heading angle θ2. In this case, if the moving speed of the vehicle 1 is slower than a threshold speed, it may be determined that the level of danger corresponds to the third level of danger. Furthermore, the danger level determiner 103 may determine the level of danger, taking into account a combination of the heading angle θ2 and the moving speed of the vehicle 1. In the case that the level of danger is determined to be the third level of danger, the danger level determiner 103 may generate and send a control signal to provide the third level of alert to the warning unit 200, which may, in turn, output the third level of alert according to the control signal.

An implementations of controlling a vehicle will now be described in connection with FIG. 13.

Figure 13:
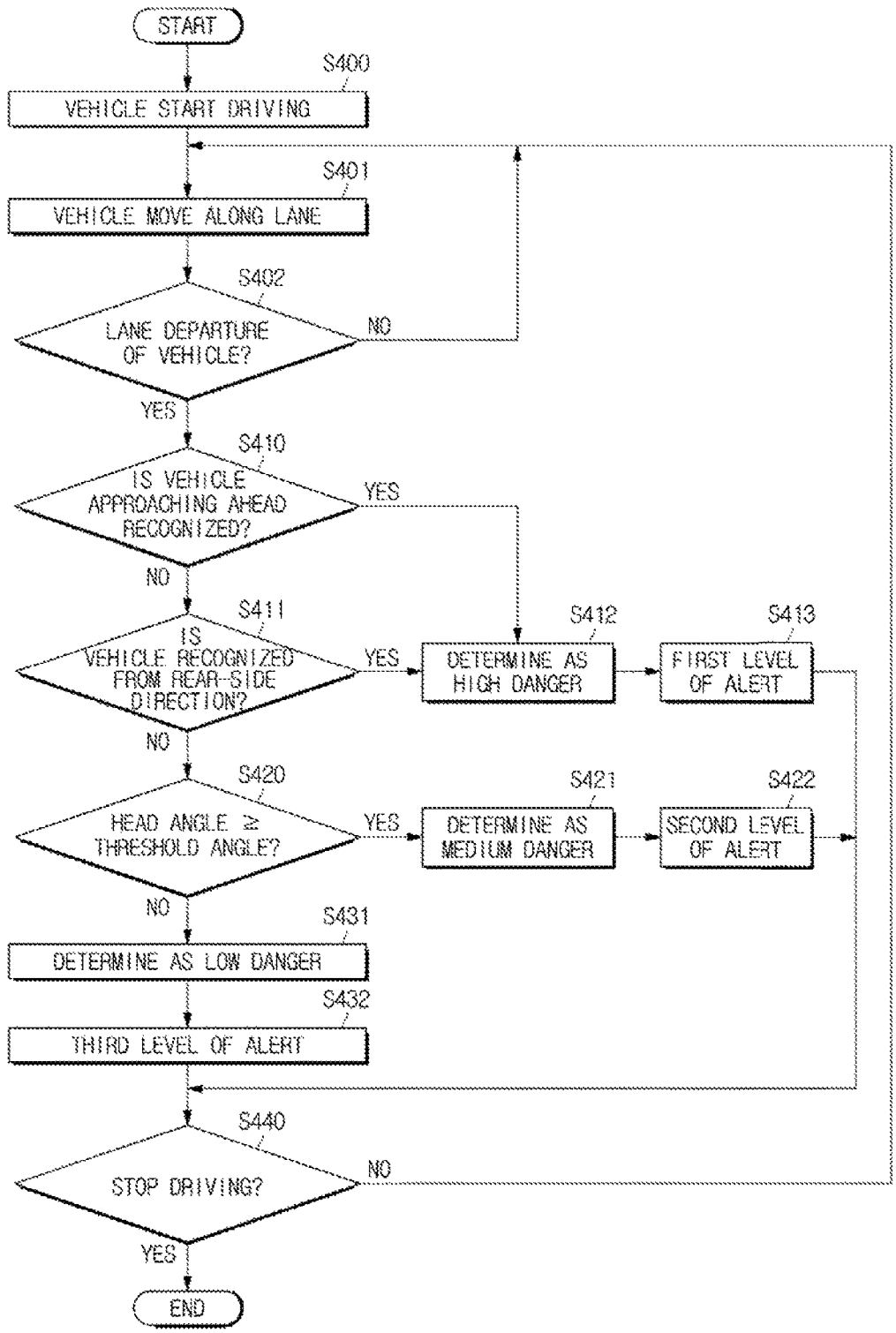
FIG. 13 is a flow chart illustrating a method for controlling a vehicle.

FIG. 13 is a flow chart illustrating a method for controlling a vehicle. In FIG. 13, first, the vehicle 1 starts driving, in operation S400. At the same time, the vehicle controller 100 may also start to operate. The vehicle 1 entering a road moves into a lane partitioned by at least one line 97 and then moves along the lane, in operation S401.

The vehicle controller 100 detects a line using information obtained from the line information obtainer 10 and determines whether the vehicle 1 moves out of the lane, in operation S402. If the vehicle 1 moves out of the lane and enters a neighboring lane, the vehicle controller 100 determines whether another vehicle is approaching ahead of the vehicle 1 in operation S410, whether another vehicle is present to the rear-side in the neighboring lane to which the vehicle 1 is moving in operation S411, or whether the heading angle of the vehicle 1 moving out of the lane is great or the moving speed of the vehicle 1 is fast in operation S420.

Specifically, if the vehicle 1 is moving out of the lane, the vehicle controller 100 first determines whether a pedestrian or another car e.g., 96 is present or approaching ahead of the vehicle 1, in operation S410. If the other car 96 is approaching ahead of the vehicle 1, the vehicle controller 100 determines that the level of danger corresponds to the first level of danger, i.e., a high level of danger, in operation S412, and sends a corresponding control signal to the warning unit 200.

The warning unit 200 provides the first level of alert to the user according to the control signal, in operation S413. In this case, the vibrator 201, display 202, and sound output 203 of the warning unit 200 all operate while the vibrator 202 vibrates relatively intensely, to provide the first level of alert to the user.

Otherwise, if the vehicle 96 is not approaching ahead of the vehicle 1, the vehicle controller 1 determines whether a pedestrian or another car e.g., 95 is present or approaching from the rear-side direction of the vehicle 1, in operation S411. If the other vehicle 95 is present or approaching from the rear-side direction, the vehicle controller 100 determines the level of danger to be the first level of danger in the same way as described above, in operation S412. In other words, the vehicle 1 is determined to be in high danger. In this case, the vehicle controller 100 generates a control signal corresponding to the first level of danger and sends the control signal to the warning unit 200.

The warning unit 200 then provides the first level of alert to the user according to the control signal, in operation S413. In this case, the vibrator 201, display 202, and sound output 203 of the warning unit 200 all operate while the vibrator 202 vibrates relatively intensely, to provide the first level of alert to the user.

Otherwise, if the vehicle 96 is not approaching ahead of the vehicle 1, nor a pedestrian or another car e.g., 95 is present or approaching from the rear-side direction of the vehicle 1, the vehicle controller 100 determines the level of danger based on the behavior of the vehicle 1, in operation S420. Specifically, the vehicle controller 100 compares the heading angle of the vehicle 1 with a predetermined threshold angle, and determines whether the heading angle exceeds the threshold angle. If the heading angle exceeds the threshold angle, the vehicle controller 100 determines that the level of danger corresponds to the second level of danger, i.e., a medium level of danger, in operation S421, and generates and sends a corresponding control signal to the warning unit 200. In some forms, the vehicle controller 100 determines whether the moving speed of the vehicle 1 exceeds a predetermined threshold speed, and if the moving speed exceeds the threshold speed, the vehicle controller 100 determines that the level of danger corresponds to the second level of danger, i.e., that the vehicle 1 is in medium danger, and generates a corresponding control signal.

The warning unit 200 provides the second level of alert to the user according to the control signal, in operation S422. In this case, the vibrator 201, display 202, and sound output 203 of the warning unit 200 all operate while the vibrator 202 vibrates relatively less intensely than in the case of providing the first level of alert, to provide the second level of alert to the user.

If the other vehicle 96 is not approaching ahead of the vehicle 1 nor a pedestrian or other car e.g., 95 is present from the rear-side direction of the vehicle 1, and if the heading angle or moving speed of the vehicle 1 does not exceed the threshold angle or threshold speed, the vehicle controller 100 determines that the level of danger corresponds to the third level of danger, i.e., that the vehicle 1 is in low danger in operation S431, and generates and sends a corresponding control signal to the warning unit 200.

The warning unit 200 then provides the third level of alert to the user according to the control signal, in operation S432. In this case, particular components of the warning unit 200, e.g., only the vibrator 201 and the display 202 operate while the sound output 203 is not operating, to provide the third level of alert to the user. In this case, the vibrator 201 may vibrate even less intensely than in the case of providing the first level of alert.

As such, different levels of alert may be provided based on different levels of danger while the vehicle 1 is moving out of lane, thereby allowing the user to appropriately deal with the situation.

After the lapse of a predetermined period of time, the first, second, or third level of alert may be terminated.

Even after the alert was terminated, the process including operations S401 to S432 may repeated until the vehicle 1 stops driving in operation S440.

As shown in FIG. 13, the vehicle controller 100 may sequentially determine whether another vehicle is approaching ahead of the vehicle 1 (S410), whether another vehicle is present from the rear-side direction of the vehicle 1 (S411), whether the heading angle or moving speed of the vehicle 1 is great or fast (S420). However, the determination sequence is not limited thereto, but may be arbitrarily determined by the designer. For example, the vehicle controller 100 may first determine whether another vehicle is present from the rear-side direction in the lane into which the vehicle 1 is moving (S411), and then determine whether another vehicle is approaching ahead of the vehicle 1.

The method according to the forms of the present disclosure may be implemented in program instructions which are executable by various computing means and recorded in computer-readable media. The computer-readable media may include program instructions, data files, data structures, etc., separately or in combination. The program instructions recorded on the computer-readable media may be designed and configured specially for the present disclosure, or may be well-known to people having ordinary skill in the art of computer software. Examples of the computer readable recording medium include read-only memory (ROM), random-access memory (RAM), Compact Disc (CD)-ROMs, magnetic tapes, floppy disks, optical data storage devices, etc. The computer readable recording medium can also be distributed over network coupled computer systems so that the computer readable code is stored and executed in a distributed fashion.

Examples of the program instructions may include not only machine language codes but also high-level language codes which are executable by various computing means using an interpreter.

The aforementioned hardware devices may be configured to operate as one or more software modules to carry out exemplary forms of the present disclosure, and vice versa.

According to implementations of the vehicle, and apparatus and method for controlling the vehicle, an efficient alert function to provide different alerts according to different levels of danger around the vehicle while the vehicle is moving out of a lane may be provided.

The driver may then appropriately and quickly react to the provided alert according to whether the alert is a strong alert or a weak alert, thereby improving driving safety.

With the different alerts provided based on different levels of danger around the vehicle, a weak alert is provided in a situation having a relatively low level of danger, to improve emotional quality for consumers.

Furthermore, since the different alerts are provided taking into account various factors in addition to whether the vehicle is moving out of a lane, the provided alerts may be likely to meet the driver's needs. Accordingly, unnecessary alerts may not or may be unlikely to be provided, thereby increasing driving convenience of the driver.

Several forms have thus been described, but it will be understood that various modifications can be made without departing from the scope of the present disclosure. Thus, it will be apparent to those ordinary skilled in the art that the disclosure is not limited to the forms described, but can encompass not only the appended Claims but the equivalents.

What is claimed is:

1. A vehicle comprising:
   a line information obtainer configured to obtain information regarding a line;
   a rear-side vehicle recognizer configured to:
      recognize an intruding vehicle located at a rear direction from the vehicle or a side direction from the vehicle; and
      generate vehicle recognition data identifying the intruding vehicle when the intruding vehicle is recognized as being located at the rear direction from the vehicle or the side direction from the vehicle;
   a vehicle controller configured to:
      receive the vehicle recognition data from the rear-side vehicle recognizer;
      determine whether the vehicle is moving out of a lane based on the information regarding the line;
      determine a level of danger that indicates an extent of danger to the vehicle while the vehicle is moving out of the lane based on at least one of a condition around the vehicle or a behavior of the vehicle while the vehicle is moving out of the lane; and
      determine the level of danger is high when the vehicle recognition data identifies the intruding vehicle while the vehicle is moving out of the lane; and
   a warning unit configured to provide different levels of alert according to the level of danger.

2. The vehicle of claim 1,
   wherein the warning unit is configured to provide a first level of alert when the level of danger is relatively high, and a second level of alert, which is different from the first level of alert, when the level of danger is relatively low.

3. The vehicle of claim 2, wherein the warning unit is configured to provide the first level of alert to the driver when the level of danger is high.

4. The vehicle of claim 2, further comprising:
   a front vehicle recognizer configured to:
      recognize another intruding vehicle ahead of the vehicle; and
      generate vehicle recognition data identifying the another intruding vehicle when the another intruding vehicle is recognized as being located ahead of the vehicle;
   wherein the vehicle controller is configured to determine that the level of danger is high when the vehicle recognition data identifies the another vehicle while the vehicle is moving out of the lane, and wherein the warning unit is configured to provide the first level of alert to the driver when the level of danger is high.

5. The vehicle of claim 2, wherein the vehicle controller is configured to compare a heading angle of the vehicle with a predetermined threshold angle while the vehicle is moving out of the lane, and to determine that the level of danger is medium when the heading angle is greater than the threshold angle, and wherein the warning unit is configured to provide the second level of alert to the driver when the level of danger is medium.

6. The vehicle of claim 5, wherein the different levels of alert further include a third level of alert that corresponds to a relatively lower level of danger than the level of danger corresponding to the second level of alert, and wherein the warning unit is configured to provide the third level of alert to the driver if the heading angle of the vehicle is smaller than the threshold angle.

7. The vehicle of claim 5, wherein the vehicle controller is configured to compare the heading angle of the vehicle with the predetermined threshold angle when the vehicle recognizer fails to recognize the intruding vehicle.

8. The vehicle of claim 2, wherein the vehicle controller is configured to detect a lane departure speed of the vehicle while the vehicle is moving out of the lane, and to compare the lane departure speed with a predetermined threshold speed, and wherein the warning unit is configured to provide the second level of alert to the driver when the lane departure speed is higher than the threshold speed.

9. The vehicle of claim 1, wherein the warning unit is configured to include at least one of a vibrator, a display, or a sound output.

10. The vehicle of claim 9, wherein the vibrator is configured to be located in at least one of a spoke or a wheel where a steering wheel is gripped, and to provide different intensities of vibration according to the level of danger.

11. A method for controlling a vehicle, the method comprising:

obtaining, by a line information obtainer of the vehicle, information regarding a line;

recognizing, by a rear-side vehicle recognizer of the vehicle, an intruding vehicle located at a rear direction from the vehicle or a side direction from the vehicle;

generating, by the rear-side vehicle recognizer, vehicle recognition data identifying the intruding vehicle when the intruding vehicle is recognized as being located at the rear direction from the vehicle or the side direction from the vehicle;

receiving, by a vehicle controller, the vehicle recognition data from the rear-side vehicle recognizer;

determining, by the vehicle controller, whether the vehicle is moving out of a lane based on the information regarding the line;

determining, by the vehicle controller, a level of danger that indicates an extent of danger while the vehicle is moving out of the lane based on at least one of a condition around the vehicle or a behavior of the vehicle while the vehicle is moving out of the lane;

determining, by the vehicle controller, the level of danger is high when the vehicle recognition data identifies the intruding vehicle while the vehicle is moving out of the lane; and providing, by a warning unit of the vehicle, different levels of alert to a driver according to the level of danger.

12. The method of claim 11, wherein providing different levels of alert to a driver according to the level of danger comprises providing a first level of alert when the level of danger is relatively high, and a second level of alert, which is different from the first level of alert, when the level of danger is relatively low.

13. The method of claim 12, wherein providing different levels of alert to a driver according to the level of danger comprises providing the first level of alert to the driver when the level of danger is high.

14. The method of claim 12, further comprising:

recognizing, by a front vehicle recognizer of the vehicle, another intruding vehicle ahead of the vehicle;

generating vehicle recognition data identifying the another intruding vehicle when the another intruding vehicle is recognized as being located ahead of the vehicle; and determining that the level of danger is high when the vehicle recognition data identifies the another vehicle while the vehicle is moving out of the lane, and wherein providing different levels of alert to a driver according to the level of danger comprises providing the first level of alert to the driver when the level of danger is high.

15. The method of claim 12, wherein determining a level of danger that indicates an extent of danger while the vehicle is changing the line, based on at least one of a condition around the vehicle or a behavior of the vehicle while the vehicle is moving out of the lane comprises comparing a heading angle of the vehicle with a predetermined threshold angle while the vehicle is moving out of the lane, and determining that the level of danger is medium when the heading angle is greater than the threshold angle, and wherein providing different levels of alert to a driver according to the level of danger comprises providing the second level of alert to the driver when the level of danger is medium.

16. The method of claim 15, wherein determining a level of danger that indicates an extent of danger while the vehicle is changing the line, based on at least one of a condition around the vehicle or a behavior of the vehicle while the vehicle is moving out of the lane comprises providing a third level of alert that corresponds to a relatively lower level of danger than the level of danger corresponding to the second level of alert, and wherein providing different levels of alert to a driver according to the level of danger comprises providing the third level of alert to the driver if the heading angle of the vehicle is smaller than the threshold angle.

17. The method of claim 15, wherein comparing a heading angle of the vehicle with a predetermined threshold angle while the vehicle is moving out of the lane is performed when no vehicle is recognized from at least one of the forward direction or the rear-side direction of the vehicle.

18. The method of claim 12, wherein determining a level of danger that indicates an extent of danger while the vehicle is changing the line, based on at least one of a condition around the vehicle or a behavior of the vehicle while the vehicle is moving out of the lane comprises: detecting a lane departure speed of the vehicle while the vehicle is moving out of the lane, comparing the lane departure speed with a predetermined threshold speed, and determining the level of danger to be medium when the lane departure speed is higher than the threshold speed, and wherein providing different levels of alert to a driver according to the level of danger comprises: providing the second level of alert to the driver.

19. The method of claim 11, wherein the warning unit is configured to include at least one of a vibrator, a display, or a sound output.

20. The method of claim 19, wherein the vibrator is configured to be located in at least one of a spoke or a wheel where a steering wheel is gripped, and provide different intensities of vibration according to the level of danger.

* * * * *